United States Patent [19]

Katz

[11] 4,291,603

[45] Sep. 29, 1981

[54] ELECTRONIC ORGAN

[76] Inventor: Bernard R. Katz, 21 Woodside Dr., Rockaway, N.J. 07886

[21] Appl. No.: 964,704

[22] Filed: Nov. 29, 1978

[51] Int. Cl.[3] .......................... G10H 1/00; H04M 1/00

[52] U.S. Cl. ....................................... 84/1.01; 84/1.22; 84/1.17; 84/1.24; 179/155

[58] Field of Search ...................... 84/1.01, 1.03, 1.17, 84/1.22, 1.24; 179/155

[56] References Cited

U.S. PATENT DOCUMENTS

| | | | |
|---|---|---|---|
| 3,895,553 | 7/1975 | Kawamoto | 84/1.01 |
| 3,902,397 | 9/1975 | Morez et al. | 84/1.01 |
| 3,982,461 | 9/1976 | Kugisawa | 84/1.03 |
| 4,003,003 | 1/1977 | Haeberlin | 84/1.01 |
| 4,109,208 | 8/1978 | Tomisawa et al. | 307/225 R |
| 4,133,242 | 1/1979 | Nagai et al. | 84/1.22 |
| 4,177,707 | 12/1979 | Boucher | 84/1.01 |

*Primary Examiner*—B. Dobeck
*Assistant Examiner*—Forester W. Isen
*Attorney, Agent, or Firm*—Thomas L. Adams

[57] ABSTRACT

An electronic organ has a tone generating system for producing tones corresponding to notes of a musical scale. The tones and combinations thereof are selectable to provide different characteristics or "voices" which duplicate the various voices which are selectable on a pipe organ. The character of each such voice is determined by a single generator. The character of the output tone on a per manual basis is alterable by substituting or combining the outputs of different generators. The signal produced in this manner is sampled at a rate which translates it to an audio frequency.

25 Claims, 12 Drawing Figures

FIG. 4A
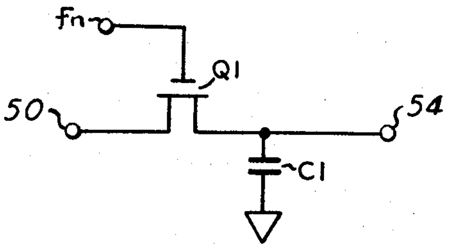
FIG. 4B
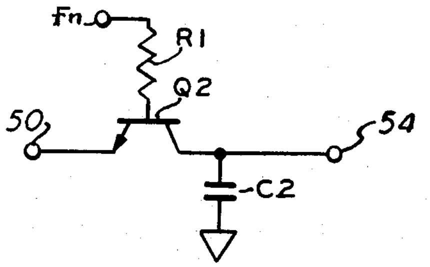
FIG. 5
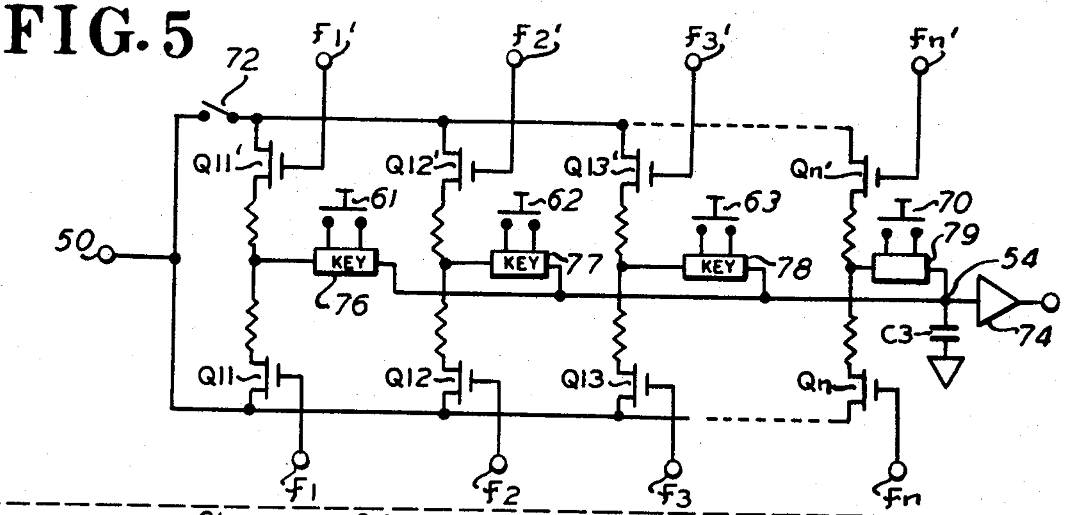
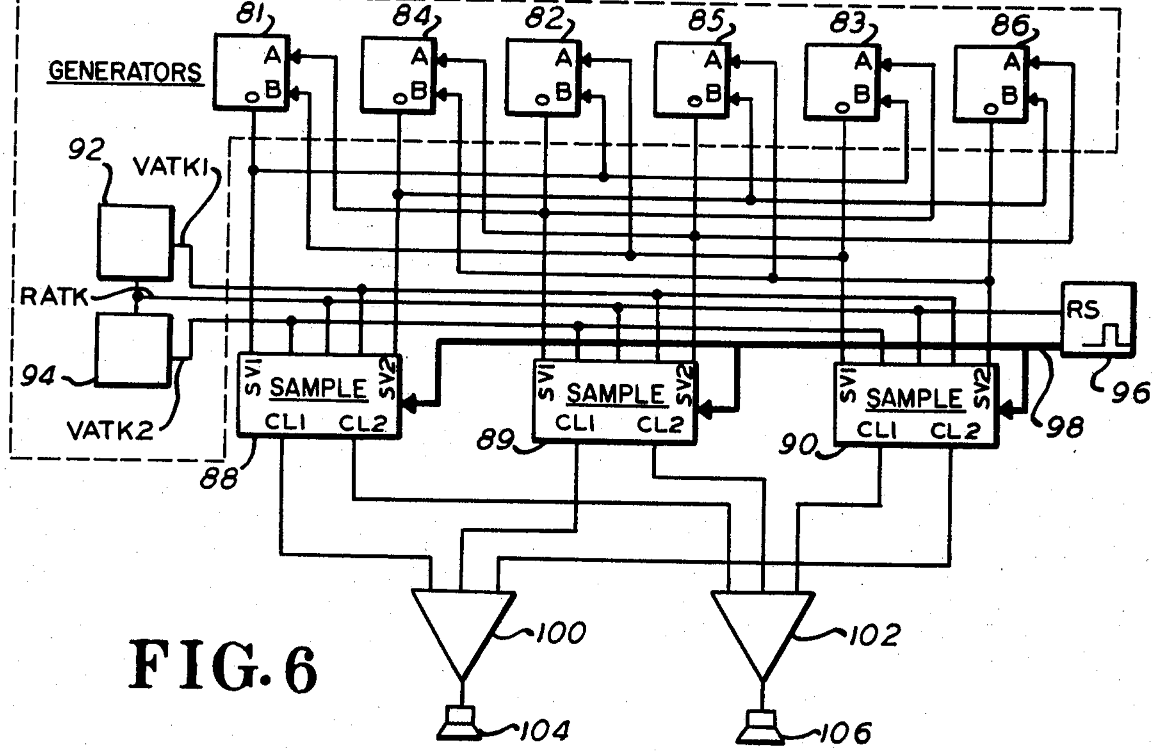
FIG. 6

ELECTRONIC ORGAN

BACKGROUND OF THE INVENTION

1. Field of the Invention

The invention relates to instruments which can electronically produce a purality of tones, the characteristics of such tones being selectable.

2. Prior Art

A coventional organ can have several keyboards which are referred to as manuals. Each manual has typically sixty-one keys with span five octaves. Associated with each manual are several groups of pipes which are referred to as ranks of pipes. The pipes in these ranks correspond to the keys in the associated manual, so that there are typically sixty-one pipes in ranks associated with a sixty-one key manual. Additionally a pedal manual with 30 or 32 keys is provided to be played by the performer's feet.

The ranks played by any one manual are selected by manual controls referred to as stops. There is normally one stop for each rank, and, in some cases, there are stops which control a group of ranks.

It is frequently desirable to play from one manual ranks associated with another manual. Equipment to perform this function are referred to as intermanual couplers. These couplers can intercouple manuals so that actuation of a key plays pipes associated with the corresponding key on the other manual. These couplers can also be arranged so that actuation of a key in one manual plays pipes associated with an octavely related key in the other manual. The difference can be chosen as one or more octaves. If the coupled key is of a higher or lower note, this is referred to as superoctave or suboctave coupling, respectively.

It is also frequently desirable to couple together keys of the same manual so that actuation of one key operates octavely related keys in the same manual. If the additional key coupled in this fashion is an integer number of octaves higher of lower, this is referred to as superoctave or suboctave intramanual coupling, respectively.

An organ may have a celeste rank which is slightly mistuned from the other ranks. These celeste ranks, if played alone, would appear to have the same pitch as the other basic ranks, but when played together, the slight mistuning causes a noticeable beating effect.

An organ also has ranks whose corresponding pitches are substantially different from the basic rank (referred to in the art as an eight foot rank). These other ranks bear a harmonic relation to the basic ranks.

Ranks are also classified by the construction of their pipes, e.g. diapason, flute, string, reed etc. These classes are aurally distinct in that each has a unique harmonic richness and a unique attack (attack being the manner in which the amplitude of the tone increases).

Known electronic organs have used separate oscillators for each key of a manual. This approach has practical disadvantages for organs having more than several stops since the required number of oscillators is the product of the number of notes and stops. Known techniques for reducing the number of oscillators include synthesizing a plurality of frequencies from a series of frequency dividers. However, this approach establishes a fixed phase coherence between notes so that chords have a relatively flat or lifeless quality.

Other known electronic organs have tried to minimize the number of independent oscillators by providing an n x m matrix of oscillators, with n being the number of notes in an octave and m the number of octaves in the manual. The m array of oscillators are distributed at octave spacings with the lowest frequency being at a supersonic frequency F. The n array of oscillators have frequencies which exceed F by amounts corresponding to the frequencies which are to be produced by the lowest octave of the manual. A selected pair from the m and n arrays are mixed to produce an audio frequency. Because one oscillator from the n array must produce m different notes, these notes must be derived from m different harmonics of that oscillator. Using different harmonics in this fashion will produce audio signals whose magnitudes can vary depending on the harmonic utilized. Moreover, the phasing of frequency components within the audio signal so produced will vary with different such harmonics.

Another disadvantage with an n x m matrix is that each additional voice requires an additional array of m oscillators. A further disadvantage is that intermanual and intramanual coupling is extraordinarily difficult to perform with an n x m matrix.

Other known systems use digital memories, each having stored therein successive values of a waveshape representing a desired voice. The number of memories, however, is multiplied by the number of voices desired. Also, additional circuitry is required to allow simultaneous actuation of different notes. In particular, circuitry is required to allow a memory to provide separate data outputs at different data rates. An example of a system of the latter type is shown in U.S. Pat. No. 3,515,792.

SUMMARY OF THE INVENTION

The present invention utilizes sampling techniques to provide a tone generating system for an electronic organ. The tone generating system produces combinations of tones having selectable characteristics simulating the many voices of a conventional pipe organ. The various voices are combined to form a main signal. The main signal is sampled at the rate necessary to produce an audio signal at the desired pitch. The sampling is controlled by a plurality of key signal generators. Each tone which is to be produced has a predetermined relation to a different key signal generator. Additionally, voicing, which is the adjusting of timbre to suit room characteristics, is simply provided by the apparatus herein disclosed.

A sufficient number of key signal generators are provided to produce from a single voice, notes spanning more than an octave with an inter-frequency spacing of less than an octave. In fact, every note on the keyboard can be produced in this fashion. Because of this arrangement, the addition of another voice requires the addition of only a single voice signal generator, and no additional sampling circuits are required. Also, by sampling with the above key signal generators a faithful replica of the voices contained in the main signal is provided. This replication is consistent from note to note across the entire keyboard. Essentially, the amplitude and phase relation with respect to the harmonic content of the reproduced waveshape remains constant while only frequency changes.

Moreover, it is practical to produce highly complex voices since the voice waveshape need only be produced once, and this single waveshape will service all combinations of notes.

In accordance with illustrative embodiments demonstrating features of the instant invention there is provided a tone generating system of an electronic organ for producing a plurality of notes. Each of these tones has a frequency corresponding to a different note on a musical scale. The tone generating system includes a plurality of voice signal generators, each producing a supersonic signal having a different waveshape. The tone generating system also includes a manually operable main selection means for combining selected ones of the plurality of voice signal generators to produce a main signal. Also included is a plurality of key signal generators producing a plurality of key signals. Each of the plurality of notes corresponds to and has a predetermined frequency relation with a different one of the plurality of key signals. The plurality of notes have unique frequencies spanning more than an octave and are distributed with a separation of less than an octave between adjacent frequencies. The tone generating system also includes a plurality of main sampling means each operable to repetitively sample the main signal in response to a corresponding one of the plurality of key signal generators. The plurality of main sampling means are operable to produce a plurality of main sampled signals. Also included in the tone generating system is a main output means for combining audio frequency components contained in the plurality of main sampled signals. Also included is a manually playable main keyboard means for actuating the note generating system. The main keyboard means is operable to provide to the main output means any combination of the plurality of main sampled signals to produce the plurality of notes.

In an alternate embodiment of the same invention there is substituted for the foregoing plurality of main sampling means and main output means, a main sampling means. This main sampling means can sample the main signal and can respond to each of the plurality of key signals to produce the plurality of tones.

A feature of the preferred embodiment of the present invention is provision of intermanual couplers for playing from one manual, voices associated with another manual. In its simplest form, the coupling is produced by a single pole switch which combines the main signal, containing the voice waveshape information from one manual, into the main signal of another manual. In another form the coupler can selectively multiply or divide the frequency of the main signal from the other manual to provide superoctave or suboctave coupling, respectively. Such frequency alteration can be conveniently implemented since only a single signal need be altered.

Another feature of the preferred embodiment is the provision of an amplitude modulator in the sampling circuits to simulate the various attacks of different classes of pipes. The attack for each class is controlled by a single attack generator. Since only a single generator per class is required, a complex attack waveform is conveniently implemented. Each sampler has a supplemental attack sampler which commences sampling in response to actuation of an associated key on the keyboard. Since the attack signal is sampled, it can be of a frequency which is high relative to the frequency components of the attack envelope waveshape. Accordingly, the attack sampler can commence to produce a signal without any substantial delay since the attack characteristic so produced has only a moderately slow risetime. This feature enables one attack generator to also service all of the keys of the keyboard for a particular class of voices, for example a diapason class.

Still another feature of the preferred embodiment of the invention is the provision of a device to offset and modulate the frequency of a voice signal generator to a limited extent. This feature eliminates phase coherence between different voices so that the voices so produced have a vibrant quality. The latter feature is easy to implement because of the relatively small number of voice signal generators.

A feature of an alternate embodiment of the invention is the use of a single sampler to produce a plurality of notes. The single sampler is operated in response to combinations of key signal generators. Each key signal has a different frequency and duty cycle so that the output component from the sampler resulting from that key signal has the same amplitude as other output components resulting from other key signals.

Another object of the present invention is to provide the above feature with relatively simple circuitry for duplicating the many-voiced sound of a conventional air driven pipe organ.

Various other objects and features of the invention will be apparent from the detailed description given below when taken in conjunction with the accompanying drawing and claims which form part of this specification.

BRIEF DESCRIPTION OF THE DRAWINGS

In the following descriptions and in the claims, parts will be identified by specific names for convenience, but such names are intended to be as generic in their application to similar parts as the art will permit. Like reference characters denote like parts in the several figures of the drawing in which:

FIG. 4A is partial schematic showing one sampling means;

FIG. 4B is a partial schematic showing another sampling means;

FIG. 5 is a partial schematic showing an array of sampling means;

FIG. 6 is a system block diagram of an embodiment of the invention which separates tones by class and applies different attacks thereto;

DETAILED DESCRIPTION

Figure 1:
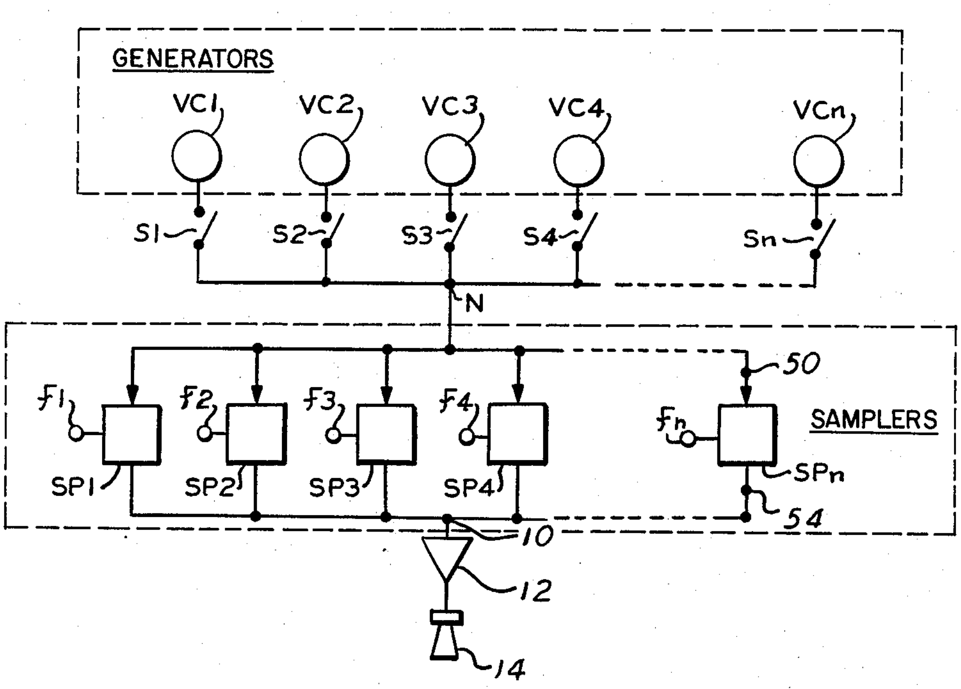
FIG. 1 is a system block diagram according to the invention.

Referring to FIG. 1, a plurality of voice signal generators VC1, VC2, VC4 to VCN are shown coupled to node N by switches S1, S2, S3, S4 to SN, respectively. These voice signal generators (hereinafter collectively referred to as generators VC) produce periodic supersonic signals at harmonically related repetition rates. The basic repetition rate may be 100 kHz. It is appreciated, however, that other frequencies will operate satisfactorily. However, certain members of generators VC have repetition rates of 200, 300, 400, 500, 600, 700 and 800 kHz, although other rates may be employed. Each of the generators VC produces a complex waveshape which simulates waveshapes produced by a pipe of an organ. Each of the generators VC is composed of an analog circuit such as a pulse-excited tuned network. It is apparent, however, that other circuits such as a diode waveshaper, a tapped delay line, a charge coupled device in a reentrant configuration or other circuits well known to those skilled in the art may be employed. Generator VC can also produce its waveshape from digitized sources. The waveshape provided corresponds to the amplitude of sound waves produced in a cycle by a pipe of an organ. Each of the generators VC has an output impedance such that coupling of them to node N produces there a voltage proportional to their sum.

Coupled between node N and node 10 are a plurality of main sampling means SP1, SP2, SP3, SP4 to SPn (hereinafter collectively referred to as sampler SP).

It is appreciated that the dotted lines in FIG. 1 represent unillustrated members of the generators VC and samplers SP and that their number can be increased or reduced from the number specifically illustrated. Dotted lines subsequently illustrated have a similar meaning. Each of the samplers SP has switching means, more particularly described hereinafter, which can couple a signal proportional to that on node N to node 10. Samplers SP are arranged to additively combine their respective outputs into node 10. Samplers SP operate in response to sampling signals applied to the terminals marked f1, f2, f3, f4, to fn. The sampling signals applied thereto are short pulses repeating at frequencies bearing a predetermined relation to the repetition rates of the signals at node N. Referring to a basic voice frequency of 100 kHz, each sampling signal has a frequency equal to the frequency difference between the basic frequency at node N (100 kHz) and the frequency of the note which is to be reproduced by the associated sampler. For example, the sampling signal of terminal f1 is arranged to produce, with a voice signal at 100 kHz, the lowest basic note. The lowest basic note for an 8 foot voice is 65.4 Hz. Accordingly, the frequency of the signal at terminal f1 is (100.0654) or 99.9346 kHz. The other terminals f1 to fn are provided with pulses of progressively lower repetition rates so that there is separately provided to the samplers SP signals whose repetition rates each have the above-mentioned relation to the frequencies at node N and the note to be produced. The duty cycle of the pulses at each of the terminals f1 to fn may be approximately the same.

Connected to node 10 is an audio amplifier 12 which drives loudspeaker 14.

Switches S1 to Sn are that part of the invention referred to as a manually operable main selection means. Node 10 is that part of the invention referred to as the main output means. The generators connected to terminals f1 to fn are that part of the invention referred to as the plurality of key signal generators.

The samplers SP operate conventionally in that successive periodic samples can be used to reconstruct the sampled signal. Prior to sampling, each voice signal has a spectrum spanning from its repetition rate to a frequency somewhat higher. This frequency span is the bandwidth required to characterize the specific waveshape of the sampled signal.

As is well known, the spectrum of the sampled signal is shifted in frequency by the sampler ±nfs where $f_s$ is the sampling frequency and n is an integer representing the sampling harmonic utilized. The amplitude of the signal produced by the sampling process will be the same as the original input signal if a well-known sample and hold circuit is provided. Such a circuit holds its output at the last sampled value. While other arrangements are available, a simple sample and hold circuit can comprise a switch coupled to a holding capacitor. With such an arrangement the output amplitude is independent of the sampling harmonic utilized.

The sampling harmonic utilized to produce an output will depend upon the frequency of the component being sampled. If more than one frequency component appears at node N, more than one harmonic is used. The frequency relations are as follows:

$$f_v = nf_r$$

$$f_s = f_r - f_t$$

$$f_o = f_v - nf_s = nf_t$$

where $f_v$ is the frequency of the voice signal being sampled and $f_s$ is the frequency of sampling. The basic voice frequency is $f_r$ which, as previously mentioned, is 100 kHz, preferrably. The frequency of the basic audio tone which is to be produced is referred to as $f_t$. The frequency of the output is $f_o$ which is equal to $f_t$ or harmonics thereof. The number of the active harmonic of the sampling rate which is utilized is n. As an example, a voice signal at the basic frequency of 100 kHz can combine with the first harmonic of the sampling rate (n=1) to produce a desired tone. In this example, the sampling frequency for a note of 65.4 Hz ($f_t$=65.4 Hz) is the aforementioned 99.9346 kHz.

The foregoing apparatus can be arranged so it is playable as would be a conventional organ. It is apparent that the voice generators VC are operable in various combinations to produce tones having various waveshapes. They therefore duplicate different stops and different classes of pipes in an organ. It is also apparent that this apparatus is operable to produce harmonically related tones from a single sampler. The latter feature duplicate ranks of pipes having a given harmonic relation to other ranks of pipes. Accordingly, the switches S1 to Sn can be manually operated with an effect similar to operating stops on a conventional organ. It is also appreciated that any combination of switches can be operated to produce any desired combinations of voices.

Finally, since the signals produced by the samplers SP contain both audio and supersonic components, low pass filtering is performed by amplifier 12 so that effectively only the desired audio signals are applied to loudspeaker 14.

Figure 2:
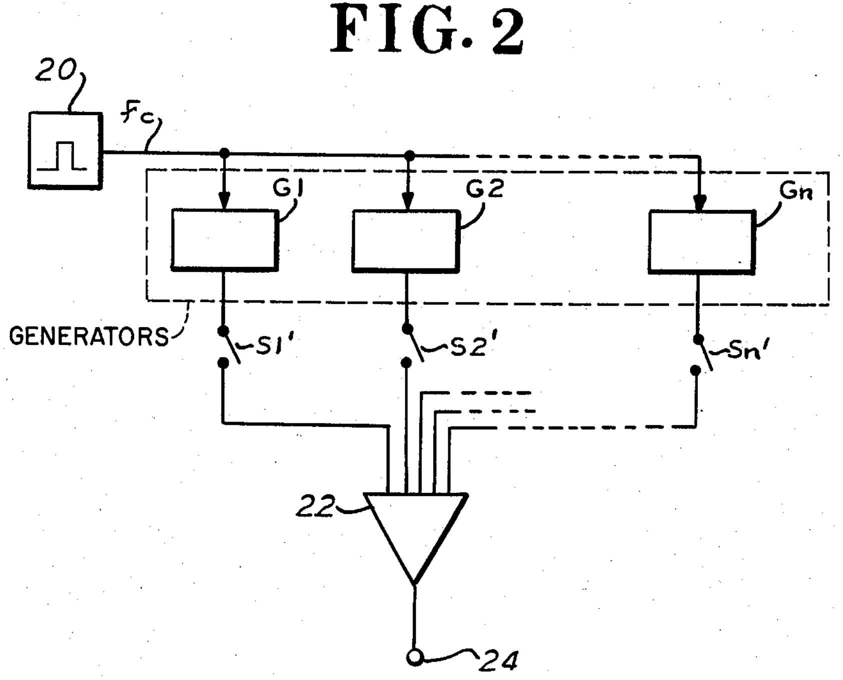
FIG. 2 is a partial schematic showing the generating and combining of voice signals.

Referring to FIG. 2, further detail of voice signal generation is given. The generators G1, G2 to Gn correspond to generators VC of FIG. 1. Additionally shown is clock generator 20 which connects to and provides periodic pulses for actuating each of the generators G1 to Gn so that they produce voice signals having harmonically related repetition rates. These voice signals are coupled by switches S1′ to Sn′ to separate inputs of adder 22 which may be a conventional summing amplifier using resistive mixing. Adder 22 produces an output on terminal 24 representing the sum of the inputs to adder 22. Switches S1' to Sn' functionally correspond to the switches of FIG. 1 while adder 22 corresponds to node N.

In operation, the voice signals produced by generators G1 to Gn in response to the clock 20 are coupled to or disconnected from adder 22, in any combination, by manually operated switches S1' to Sn'. These switches duplicating the stop controls on a pipe organ.

Figure 3:
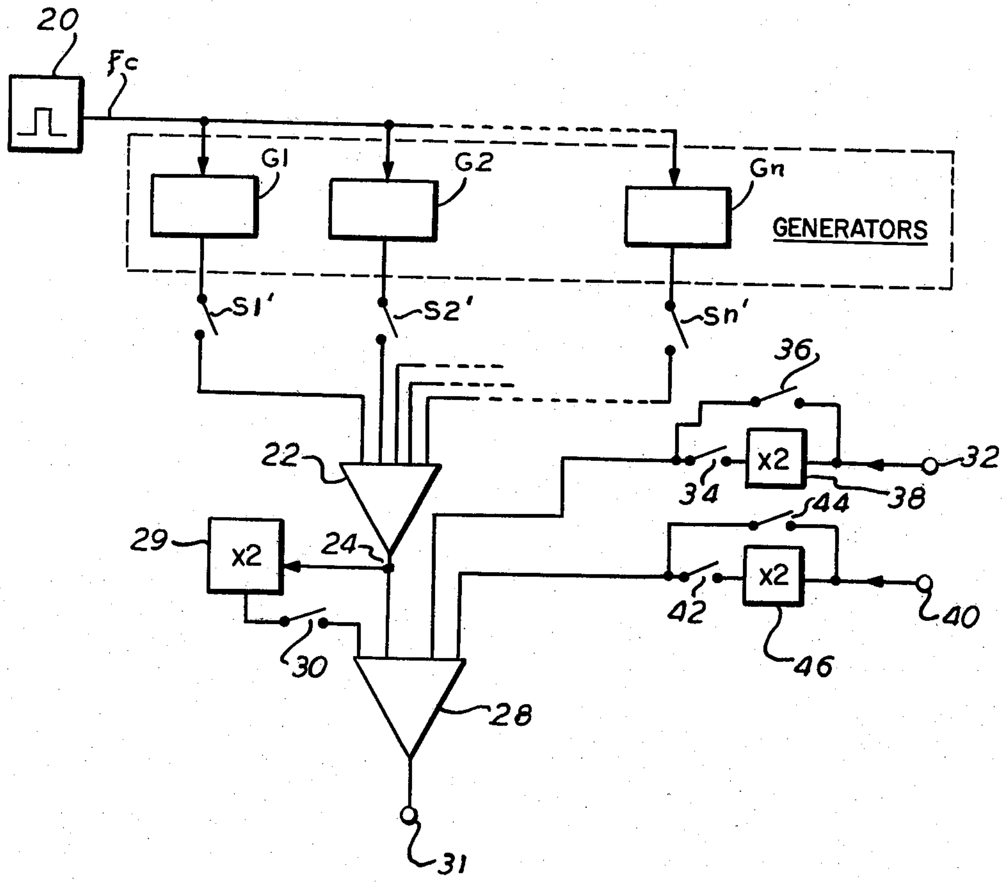
FIG. 3 is a partial schematic showing apparatus alternate to that of FIG. 2.

Referring to FIG. 3 apparatus alternate to that of FIG. 2 is schematically represented. This apparatus is similar to that of FIG. 2 but has additional equipment added thereto such as the devices 28, 29, 38 and 46 and associated switches. Elements in FIGS. 2 and 3 which are constructed identically bear the same designation in both Figures.

In FIG. 3, terminal 24 is directly connected to one input of adder 28 and serially connected to another input thereof through serially connected multiplier 29 and switch 30. Adder 28 is constructed similarly to adder 22.

Multiplier 29 multiplies each frequency component in the output of adder 22 by an integer factor, preferrably two, and feeds its output through switch 30 to an input of adder 28. Multiplier 29 may employ well-known circuitry, such as scanned charge-coupled analog delay lines or sampled magnetostrictive or electromechanical delay lines. Coupling signals through multiplier 29 in this fashion produces superoctave intermanual coupling.

The voice generators G1 to Gn of FIG. 3 are arranged to produce signals for a specific manual. However, the output on terminal 24 can be coupled to circuitry associated with another manual so it can play the voices on terminal 24. Similarly, a signal from another manual corresponding to the signal on terminal 24 appears as an input on terminal 32. Connected in parallel between an input of adder 28 and terminal 32 is switch 36 and the serial combination of switch 34 and multiplier 38. Multiplier 38 is constructed similarly to multiplier 29. Also, connected in parallel between an input of adder 28 and terminal 40 is switch 44 and the serial combination of switch 42 and frequency multiplier 46. Connected to terminal 40 is a signal corresponding to that of terminal 32 but produced by another manual. Multiplier 46 multiplies the frequency of each frequency component on terminal 40 by an integer factor, preferrably two. This multiplication is performed in a well-known manner using devices such as those described in connection with multiplier 29.

It is contemplated that for some embodiments a frequency divider means may be substituted for one or both of multipliers 46 and 38. Such a frequency divider divides each input frequency component by an integer factor such as two. This division may be performed with well-known devices such as scanned charge-coupled analog delay lines or sampled magnetostrictive or electromechanical delay lines. Such frequency division will provide intermanual sub-octave coupling. With such frequency division, the sampling rates must be generated at half of the rates previously described. Thus if the basic voice frequency of 100 kHz is halved, it will be sampled at a rate of 49.9673, for example, to produce a note at 32.7 Hz. When frequency division is not selected, the second harmonic of this halved sampling rate is used, that is, 99.9346 Hz. In the latter situation a note at 65.4 Hz is produced. Switch 36, switch 44 and the two serial combinations formed of switches 34 and 42 and multiplier 38 and multiplier 46 are four embodiments of that part of the invention referred to as intermanual means wherein switches 36 and 44 are each referred to as single switch means. Multipliers 38 and 46 are those parts of the invention referred to as the multiplier means. The switch devices combining various voice signals of another manual which produce the signals on terminals 32 or 40 are that part of the invention referred to as a secondary selection means. The keyboard and samplers associated with that other manual are referred to as a secondary keyboard means and a plurality of secondary sampling means, respectively. Multiplier 29 is that part of the invention referred to as a frequency changing means, and it is contemplated that some embodiments will substitute a frequency divider for frequency multiplier 28.

In operation, the voice signals produced by generator G1 to Gn in response to clock 20 are coupled to or disconnected from adder 22, in any combination, by manually operated switches S1' to Sn'. These switches duplicate the stop controls on a pipe organ. Coupling between different manuals is accomplished by manually closing switches 34, 36, 42 and/or 44. Intermanual superoctave coupling is obtained by closing switch 34 or switch 42.

It is apparent that superoctave coupling is obtained by the switch 34 and multiplier 38 (or switch 42 and multiplier 46) since the second harmonic of the sampling rate interacts with the doubled frequency produced by multiplier 38 to provide audio frequency components twice that produced by a system without multiplier 38.

Referring to FIG. 4A, a typical detail of some of the components contained in sampler SPn of FIG. 1 is given. Transistor Q1 is a conventional MOS or junction type FET transistor having its gate connected to terminal fn, its source to terminal 50 and its drain to the junction of terminal 54 and capacitor C1. The other terminal of capacitor C1 is connected to ground. Terminal fn corresponds to the similarly identified terminal of FIG. 1. The sampling signal on terminal fn alternates between two voltage values which alternately render transistor Q1 conductive and non-conductive between its drain and source terminals. Terminals 50 and 54 correspond to the similarly identified terminals of FIG. 1.

In operation transistor Q1 samples the voice-related signals on terminal 50 by effectively connecting and disconnecting terminal 50 to the capacitor C1 in response to and at the same duty cycle as the sampling signal at terminal fn. The capacitor C1 provides a holding function and a degree of low-pass filtering.

Referring to FIG. 4B, an embodiment alternate to that of FIG. 4A is shown wherein NPN transistor Q2 is utilized. Terminals corresponding to these of FIG. 4A are similarly identified. Resistor R1 is connected between terminal fn and the base of transistor Q2 whose emitter is connected to terminal 50. Connected at terminal 54 are the collector of transistor Q2 and one terminal of capacitor C2. The other terminal of capacitor C2 is connected to ground.

Operationally, transistor Q2 and resistor R1 perform the same function as transistor Q1 of FIG. 4A.

Referring to FIG. 5, an embodiment of the samplers SP (FIG. 1) are shown in further detail and include additional samplers for producing celeste tones. Transistors Q11, Q12, Q13 to Qn, which are referred to as a plurality of switch devices, are MOS or junction type FET transistors having their sources commonly connected to terminal 50. The drains of each of transistors Q11 to Qn are resistively connected to separate inputs of attack devices 76–79 respectively. Attack devices 76–79 have their outputs commonly connected to terminal 54. Devices 76–79 are operated by switches 61 to 70, respectively, which are connected thereto. Devices 76–79, as described hereinafter, each have a time varying transfer characteristic. Each commences to provide an increasing output in response to actuation of its respective switch. Switch 72 is connected between terminal 50 and the junction of the sources of transistors Q11′ to Qn′. The drains of transistors Q11′ to Qn′ are resistively connected to the separate inputs of devices 76 79, respectively. The gates of transistors Q11 to Qn are respectively connected to terminals fl to fn which are terminals shown and similarly identified in FIG. 1. The gates of transistors Q11′ to Qn′ are connected to terminals fl′ to fn′, respectively. These terminals are connected to oscillators referred to as a plurality of celeste signal generators. Transistors Q11′ to Qn′ are that part of the invention referred to as a plurality of celeste sampling means. Terminals in FIG. 5 having the same suffix numeral correspond in that they have sampling signals connected thereto whose frequencies are in the same ratio, for example 1:1.01. Commonly connected to terminal 54 is the input of audio amplifier 74 and one terminal of capacitor C3, its other terminal being grounded.

Switches 61 to 70 are part of a keyboard means in which depressing an individual key actuates an associated one of these switches. Each transistor in FIG. 5 produces a sampled signal in the same manner as described in connection with FIG. 4A and FIG. 4B. The sampled signals produced by these transistors are applied to a respective one of the attack devices 76–79 to produce a tone having a time varying amplitude when a respective one of switches 61 to 70 is manually closed. In this manner, combinations of sampled signals are combined so that a signal proportional to their sum appears at terminal 54 and is, in turn, amplified and filtered by amplifier 74 and capacitor C3.

For transistors Q11′ to Qn′ to operate in the above fashion, it is necessary for switch 72 to be closed, otherwise these transistors produce no signal. With switch 72 closed, however, depression of any one of the keys 61 to 70 actuates a pair of sampling transistors to provide what is known in the art as a celeste rank of notes. As previously stated, corresponding sampling frequencies such as that upon terminals fl and fl′ are relatively close in frequency so that the audio tones produced by each are close in frequency. Such closeness produces a beating effect known as a celeste effect.

Referring to FIG. 6, an alternate embodiment of the invention is illustrated wherein three manuals each produce two classes of voices. It will be apparent to those skilled in the art that this system can be expanded to have a greater number of manuals and a greater number of classes of voices.

The generation equipments 81 to 86 of FIG. 5 are each generally constructed as shown in FIG. 3 and therefore each includes an adder coupled to a plurality of generators. The terminals marked 31, 32 and 40 in the latter figure correspond to the terminals marked O, A and B in the former. While each of generation equipments 81 to 86 (FIG. 5) have the same general construction as shown in FIG. 3, they do produce different waveshapes which represent different classes of voices. In particular generation equipments 81–83 produce waveshapes representing a class different from those produced by equipments 84–86. Each output O of equipments 81–83 is connected to an input terminal A or B of the other two. Similarly connected are the outputs O and inputs A and B of the equipments 84–86.

Output terminals O of equipments 81–83 are connected to inputs SV1 of samplers 88–90, respectively. Also, output terminals O of equipments 84–86 are connected to inputs SV2 of samplers 88–90, respectively. Also providing a pair of inputs to each of the samplers 88–90 are a pair of attack generators 92 and 94 along lines VATK1 and VATK2, respectively. Providing a group of sampling signals to each of the generators 88–90 is generator 96, described in detail subsequently. The sampling signals are transferred on line 98 which is in one embodiment a group of sixty-one wires corresponding to the sixty-one keys on a typical manual. The sampling signals which generator 96 produces were described earlier. Output RS of generator 96 couples a reset pulse to samplers 88–90 and to generators 92 and 94. As will become clear, each of the samplers separately processes their inputs SV1 and SV2 to produce separate, corresponding outputs CL1 and CL2 from each. Outputs CL1 and CL2 of samplers 88–90 are each connected to a separate input of summers 100 and 102. Summers 100 and 102 each produce an output signal proportional to the sum of its input signals to drive loudspeakers 104 and 106, respectively.

As will become clear from more detailed figures herein, the system of FIG. 6 can be played as three independent tone-generating systems with independent manuals. Alternatively, intermanual coupling can be provided. Also, the voices are separated into two classes which are separately sampled and which have two different types of attacks applied thereto.

The generators 81 and 84 are that part of the invention referred to as a plurality of voice signal generators comprising a first and second class of voice generators having respective first and second class switching means whereas adders 100 and 102 are referred to as main and second class output means, respectively. Generators 92 and 94 are referred to as the first and second attack generators of the invention.

Figure 7:
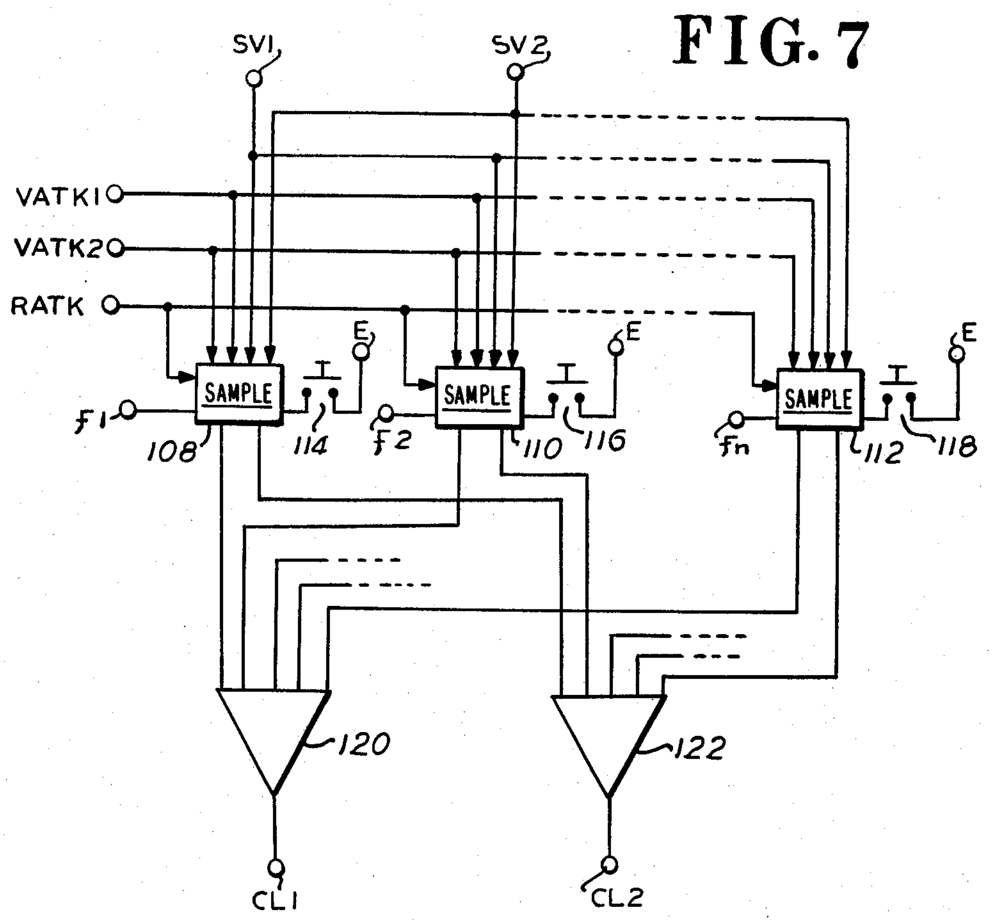
FIG. 7 is a partial schematic showing details of FIG. 6.

Referring to FIG. 7, details of circuitry in each of the samplers 88–90 (FIG. 6) are shown. This circuitry is arranged with sixty-one samplers, three of which are specifically illustrated and identified as samplers 108, 110 and 112. Each has connected to it the inputs SV1, SV2, VATK1, VATK2 and RATK. Each has a corresponding sampling signal input terminal designated fl to fn, having those characteristics previously described in connection with the identically designated terminals of FIG. 1. Each of the samplers 108–112 is actuated by key switches 114–118, respectively, which are connected between potential E existing at the designated terminals and the corresponding sampler. Each of the samplers 108–112 has a pair of outputs which are separately connected to inputs of summers 120 and 122. Summers 120 and 122 each produce outputs proportional to the sum of its input in a well-known manner on terminals CL1 and CL2, respectively. The latter terminals correspond to and bear the same designation as terminals illustrated in FIG. 6.

Figure 8:
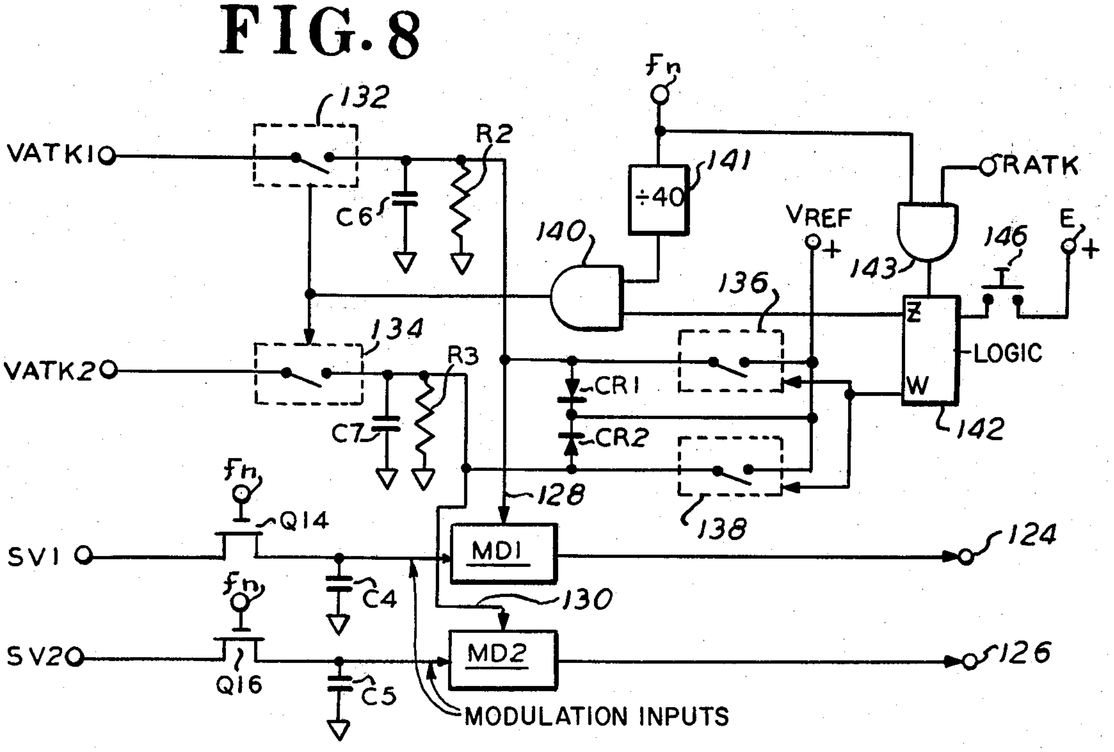
FIG. 8 is a partial schematic showing details of FIG. 7.

Referring to FIG. 8 an example of the details of one of the possible circuitries appropriate for samplers 108–112 (FIG. 6) is shown. Terminals in FIG. 8 corresponding to terminals in FIG. 7 are similarly identified. Transistors Q14 and Q16 are MOS-type FET transistors having their sources connected to terminals SV1 and SV2, respectively. Capacitor C4 is connected between ground and the junction of the input of modulator MD1 and the drain of transistor Q14. Capacitor C5 is connected between ground and the junction of the input of modulator MD2 and the drain of transistor Q16. Modulators MD1 and MD2 both have a variable transfer characteristic such that variation of the voltage on control lines 128 and 130 causes a variation of the outputs on terminals 124 and 126, respectively. Modulators MD1 and MD2 can be controlled such that their transfer characteristics are each zero, causing a zero volts signal to appear on terminals 124 and 126. Modulators MD1 and MD2 are constructed in a well-known manner and can include transistors having bias dependent gain. Alternatively, the modulators can include high-frequency choppers having a variable duty cycle which drive a low-pass filter.

Controlled switches 132, 134, 136 and 138 are commercially available semiconductor switches such as RCA type CD4016A and are arranged so that a high logic level signal applied to their control terminal closes the switch. Switches 132 and 134 have their control terminals connected to the output of AND gate 140. Switches 136 and 138 have their control terminals connected to output W of logic control 142. Switch 132 is connected between terminal VATK1 and line 128. Switch 134 is connected between terminal VATK2 and line 130. Capacitor C6 and resistor R2 are connected in parallel between ground and the junction of line 128, the anode of diode CR1 and two switched terminals, one each from switches 136 and 132. Capacitor C7 and resistor R3 are connected in parallel between ground and the junction of line 130, the anode of diode CR2 and two switched terminals, one each from switches 134 and 138. Connected in parallel between terminal VREF, which is at a predetermined constant potential, and line 128 are the switched terminals of switch 136 and diode CR1 whose cathode is connected to terminal VREF. Connected in parallel between terminal VREF and line 130 are the switched terminals of switch 138 and diode CR2 whose cathode is connected to terminal VREF. One input of AND gate 140 is driven by a divide by forty pulse counter 141 driven by the signal at terminal fn and the other input is driven by output Z of logic control 142. It is appreciated that counter 141 can count to other than forty and may be changed to suit the repetition rate of the signals at terminals VATK1 and VATK2. The signal at terminal fn is the sampling signal previously described. Logic control 142 receives as an input the output of AND gate 143 and the constant voltage on terminal E when manual switch 146 is closed by the artist depressing an associated key on the keyboard.

AND gate 143 has one input coupled to terminal RATK and its other input to terminal fn. With this connection AND gate 143 produces a pulse when the reset pulse of terminal RATK is coincident with a sampling pulse at terminal fn. Such coincidence indicates that commencement of sampling at this time will produce an initial zero volt signal across capacitors C6 and C7, which then subsequently increases. Logic control 142 is a three-state machine constructed using two flip-flops so that actuation of switch 146 causes a high signal on output Z and a low output on output W when the next coincidence pulse is produced by AND gate 143. Subsequent production of another coincidence pulse from gate 143 while switch 146 is closed causes the aforementioned logic levels to reverse, that is, output Z becomes low and output W high. When switch 146 is released, it opens, causing the outputs Z and W of control 142 to both become low.

In operation, attack signals each having a repetition rate of 2.5 kHz are applied to terminals VATK1 and VATK2. The waveshapes of these two are similar to the amplitude variations occurring when a pipe is initially actuated although varying much more rapidly. The repetition rate at terminal fn depends upon the note being produced. For a 65.4 Hz note the frequency at fn is 99.9346 kHz. This causes counter 141 to produce an output repetition rate of 2498.365 Hz. Employing such repetition rates the signal across capacitors C6 and C7 repeats at the rate of 1.635 Hz. It is apparent that this rate will be greater for notes of a higher frequency. Design modifications are also possible and it is appreciated that a different repetition rate may be used for the signals at terminals VATK1 and VATK2 and that the counter 141 can count a different number to suit that different repetition rate at terminals VATK1 and VATK2.

Prior to the closing of switch 146, output Z of control 142 is low causing AND gate 140 to apply a low signal to switches 132 and 134, thereby opening them. Also, output W applies a low signal to switches 136 and 138, opening them also. Since both diodes CR1 and CR2 are reverse biased by the positive potential at terminal VREF, lines 128 and 130 are at a ground or zero potential due to the shunting action of resistors R2 and R3, respectively. Application of zero volts to lines 128 and 130 causes modulators MD1 and MD2 to have a zero transfer characteristic so that their respective outputs on terminals 124 and 126 are zero regardless of the modulator inputs. Upon actuation of switch 146, the positive potential on terminal E is applied to controller 142 without any immediate effect until the next occurrence of a coincidence pulse from AND gate 143. That next occurrence causes output Z to change state and apply a high signal to an input of AND gate 140. Being continuously applied to the other input of AND gate 140 is the output of divide by forty counter 141 which signal is then applied to the control inputs of switches 132 and 134. The pulses produced by counter 141 derive from the sampling signal at the terminal fn. Counter 141 produces a relatively narrow pulse (of a duty cycle which is the same in counters associated with other notes) at 1/40 the frequency of that of terminal fn. As previously described a signal at terminal fn corresponding to a 65.4 note produces an attack signal across capacitors C6 and C7 which repeats at a 1.635 Hz. This corresponds to an attack build-up of approximately 0.6 seconds. Therefore, a slowly rising pair of signals (which need not rise monotonically) are separately applied to modulators MD1 and MD2 to vary their transfer characteristics. Accordingly, the sampled signals produced by transistors Q14 and Q16 (in a manner already described) are amplitude modulated.

As a result of the foregoing, tones, instead of being abruptly commenced, rise in a controlled manner which simulates the richness and presence of a large pipe. These modulating signals on lines 128 and 130 increase until they slightly exceed the positive voltage on terminal VREF at which time diodes CR1 and CR2 become forward biased. This effectively clamps the voltages on lines 128 and 130 to a maximum voltage.

Before the modulating signals decrease significantly, a second coincidence pulse is applied from AND gate 143, 0.6 seconds after the previous one (in the case of a 65.4 Hz note). The output Z and W of control 142 reverse state applying a high signal to switches 138 and 136 to close them. This closure directly applies the potential at terminal VREF to lines 128 and 130, fixing them at the aforementioned maximum voltage so that the output of the respective modulators is a signal of unvarying maximum amplitude. Simultaneously, a low signal is applied to an input of AND gate 140, which, in turn, applies a low signal to switches 132 and 134, opening them without effect.

The above condition persists until the releasing of switch 146 by the artist disconnects the positive potential on terminal E from control 142, causing its outputs Z and W to produce low signals. It will be apparent from the foregoing that these low signals cause switches 132, 134, 136 and 138 to open. As a result, the voltages across C6 and C7 exponentially decay in a well understood manner, causing the produced tone to decay similarly. Modulators MD1 and MD2 accordingly have a zero transfer characteristic a short time after a key is released, causing a cessation of the tone. It is apparent that for some embodiments the modulators MD1 and MD2 can be operated to cause other than exponential decay. The circuit components for such decay will be similar to that just described for FIG. 8, that is, the decay can be controlled by sampling devices.

In FIG. 8, transistors Q14 and Q16 are typical ones of what is referred to as the plurality of main and second class sampling means, respectively. Modulators MD1 and MD2 are those parts of the invention referred to as the first and second modulator means, respectively. Switches 132 and 134 are referred to as the attack samplers of the invention, and switches 136 and 138 are referred to as the hold means of the invention.

Referring to FIGS. 3, 6, 7 and 8, it is apparent that this schematically illustrated system can be played by depressing key switches such as switch 146 (FIG. 8) which are arranged within a keyboard to produce the usual notes on an organ. Moreover, the samplers are partitioned to apply different amplitude modulation to different classes of voices. Therefore, different classes of voices have different attacks. These voices can be manually selected by switches such as switch S1′ (FIG. 3). Finally, the voices which are selected and given specific attacks are coupled to one of the two speakers 104 and 106. The use of two speakers allows the classes of voices to have a degree of spatial separation as they would on a conventional organ.

Figure 9:
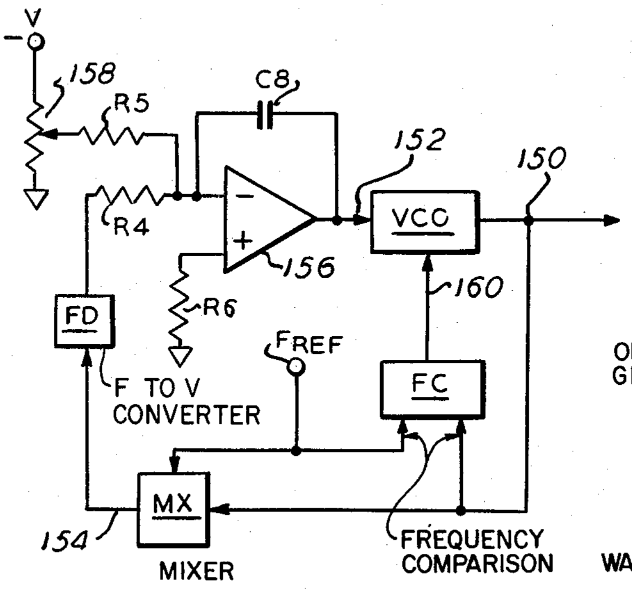
FIG. 9 is a partial schematic showing a key signal generator.

Shown in FIG. 9 is one of the plurality of sampling signal generators which is contained in block 96 of FIG. 6 and which provides signals to various terminals in FIGS. 1, 4A, 4B, 5, 7 and 8 as previously described (and in FIG. 11 as subsequently described). Voltage controlled oscillator VCO is a commercially available integrated circuit which produces on terminal 150 an output signal that varies as a function of the control voltage on input line 152. Mixer MX is a well-known device which, upon receiving inputs at two different frequencies from the terminals 150 and FREF to which it is connected, produces an output on line 154 having the difference frequency between the two inputs. Serially connected between the inverting terminal of operational amplifier 156 and the output of mixer MX are resistor R4 and frequency to voltage converter FD, whose input is driven by mixer MX. Converter FD produces an output inversely related to input frequency by using well-known circuits such as a one-shot whose output is filtered. Connected across the negative potential at terminal V and ground is the potentiometer 158 whose wiper is connected by resistor R5 to the inverting terminal of amplifier 156. Integrating capacitor C8 is connected between the output and inverting terminal of amplifier 156, whose non-inverting terminal is connected to ground by resistor R6. The output of amplifier 156 is connected to oscillator VCO which also has an error-correcting input applied to it along line 160. Line 160 is driven by the output of frequency comparator FC which has one input connected to terminal FREF and another connected to terminal 150.

The circuit of FIG. 9 operates as a closed loop voltage control oscillator to produce a signal at terminal 150 having a frequency differing from that on terminal FREF by an amount established by the setting of the wiper of potentiometer 158. If the output frequency at terminal 150 were, because of some hypothetical disturbance, lower than that required by the setting of potentiometer 158, error correction would occur as follows: This low frequency input to mixer MX would produce a high difference frequency output therefrom. Converter FD would, in response, produce an inversely small positive voltage which allows potentiometer 158 to apply a net negative voltage to the inverting terminal of amplifier 156. The negative capacitive feedback from capacitor C8 causes amplifier 156 to act as an integrator, so that its output increases in a well-known manner in response to the negative input at its inverting terminal. This increasing output, being applied to oscillator VCO, causes its output frequency to increase until an equilibrium is reached.

At equilibrium the frequency at terminal FREF exceeds that of terminal 150 by an amount which causes a difference frequency to be applied to converter FD and produce therefrom a given voltage. This voltage is sufficient to balance the effect of the voltage at the wiper of potentiometer 158 so a net zero voltage appears at the inverting terminal of amplifier 156. Accordingly, the amplifier 156, acting as an integrator, ceases changing its output value and maintains a constant charge on capacitor C8, keeping oscillator VCO at a constant frequency. It is apparent that the closed loop arrangement above-described corrects frequency errors in either direction.

The system of FIG. 9 could become unstable were it not for the operation of frequency comparator FC. Without it, the output on line 150 could exceed in frequency that at terminal FREF. Under such circumstances the feedback becomes positive, and without comparator FC oscillator VCO is driven to its maximum frequency. However, with comparator FC if the output frequency of oscillator VCO exceeded that of terminal FREF, comparator 160 applies a high signal to the oscillator driving its frequency down until it is less that than of FREF so that the closed loop can operate as previously described.

Figure 10:
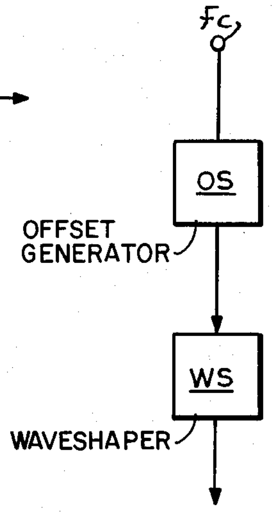
FIG. 10 is a partial schematic showing frequency offset and modulation of a voice signal generator.

Referring to FIG. 10, terminal fc, previously described in connection with FIGS. 2 and 3, is shown connected to an offset generator whose output is connected to the input of waveshaper WS. Waveshaper WS produces the supersonic voice signal previously described in response to clocking signals applied to its input by generator OS. The apparatus of waveshaper WS has been described previously. The generator OS operates to change the frequency at terminal fc by about 0.1 Hz. This offsetting causes the voice so produced to lack phase coherence with other voices. This duplicates the phase incoherence normally existing in a pipe organ from voice to voice. Generator OS may also provide time varying frequency modulation to increase the richness of tones produced by the system. Generator OS is that part of the invention referred to as an offset means.

Figure 11:
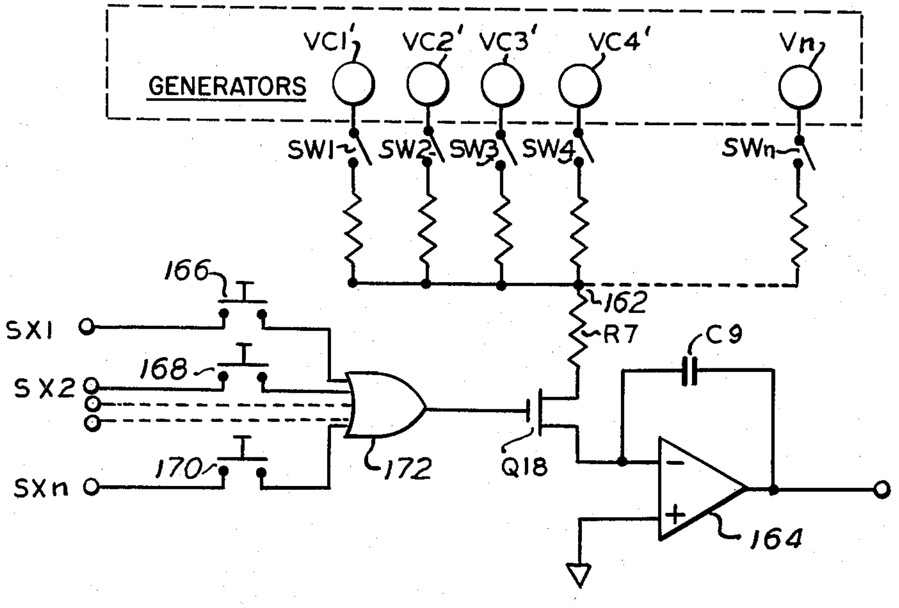
FIG. 11 is a simplified system block diagram of an alternate tone generating system according to the invention.

Referring to FIG. 11, an alternate embodiment of the invention is illustrated. Separate voice generators VC1′ to VCn′, identical in construction to similarly identified generators in FIG. 1, each have an output serially connected to node 162 by a resistor and a corresponding one of switches SW1 to SWn. Serially connected between node 162 and the inverting terminal of amplifier 164 are resistor R7 and MOS-type FET transistor Q18, through its source and drain terminals. A plurality of sampling signals are connected to terminals SX1 to SXn which have the same repetition rates as the sampling signals of FIG. 1. Terminals SX1 to SXn are connected through normally open switches 166 to 170, respectively, to separate inputs of OR gate 172 whose output is connected to the gate of transistor Q18. Integrating capacitor C9 is connected between the output and inverting input of amplifier 164, whose non-inverting input is grounded.

In the embodiment of FIG. 11, the pulses applied to terminals SX1 to SXn have a sufficiently small duty cycle such that simultaneous occurrence of pulses on two different terminals is an infrequent and, therefore, inconsequential phenomenon. It is appreciated, however, that larger duty cycles can be utilized if OR gate 172 is replaced with a linear adder to produce a signal proportional to the number of pulses applied to it. In the latter situation, Q18 is biased to conduct in proportion to the magnitude of the adder output signal.

The embodiment of FIG. 11 samples the signal at node 162 in response to the sampling signal in the output of OR gate 172. It is apparent that the sampling provided is functionally the same as provided by the apparatus of FIG. 1, except one sampler is controlled by many sampling signals. The audio components produced by the sampling are filtered and summed by the integrator formed of amplifier 164 and capacitor C9. It is appreciated that the pulse width of each sampling signal must be chosen such that all of the sampling signals produce equal amplitude signals. Similar to previously described systems, switches 166–170 are played by a keyboard arrangement and voices are manually selected by closing combinations of switches SW1–SWn. It is further appreciated that all of the circuitry shown in the preceding figures can be utilized in the system of FIG. 11 to provide the same features, including separate attack, celeste and intermanual and intramanual coupling.

The transistor Q18 is referred to as the main sampling means. Components in FIG. 11 having functions similar to earlier described components are referred to as being a similar part of the invention. Capacitor C9 and amplifier 164 are that part of the invention referred to as the integrator means.

It will be appreciated that all of the foregoing described systems can be expanded or contracted, depending upon the desired complexity. The systems can provide a single manual, single voice organ or a multivoice, multi-manual organ providing mutation, octave, mixture and celeste stops, intermanual coupling, intramanual coupling, and partitioning of outputs by manual, by voice or by classes of voice with different attacks. Therefore, the various combinations and permutations of the systems disclosed which can be constructed by persons skilled in the art are rather large. Accordingly, the foregoing embodiments are to be considered as exemplary and not limitative.

I claim:

1. A tone generating system of an electronic organ for producing a plurality of notes each having a frequency corresponding to a different note on a musical scale, comprising:

a plurality of voice signal generators, each producing a supersonic signal having a different waveshape;

a manually operable main selection means for combining selected ones of said plurality of voice signal generators to produce a main signal;

a plurality of key signal generators producing a plurality of key signals, each of said plurality of notes corresponding to and having a predetermined frequency relation with a different one of said plurality of key signals, the interfrequency spacing between adjacent ones of said plurality of notes being less than one octave, said plurality of notes having frequencies spanning more than an octave;

a plurality of main sampling means each operable to repetitively sample said main signal in response to a corresponding one of said plurality of key signal generators, said plurality of main sampling means operable to produce a plurality of main sampled signals, different ones of said plurality of main sampling means being operable to produce octavely related notes, said plurality of main sampling means comprises a plurality of switch devices having commonly coupled input terminals;

main output means for combining audio frequency components contained in said plurality of main sampled signals; and manually playable main keyboard means for actuating said tone generating system, said main keyboard means operable to provide to said main output means any combination of said plurality of main sampled signals to produce said plurality of notes, said plurality of switch devices having output terminals coupled to said main keyboard means, said main keyboard means being operable upon said switch devices to produce the effect of coupling selected ones of said output terminals together and to said main output means.

2. A tone generating system according to claim 1 further comprising:

manually operable secondary selection means for combining selected ones of said plurality of voice signal generators to produce a secondary signal;

a plurality of secondary sampling means each operable to repetitively sample said secondary signal in response to a corresponding one of said key signal generators, said plurality of secondary sampling means operable to produce a plurality of secondary sampled signals, said main output means operable to combine audio frequency components contained in said plurality of secondary sampled signals; and manually playable secondary keyboard means for actuating said tone generating system, said secondary keyboard means operable to provide to said main output means any combination of said plurality of secondary sampled signals.

3. A tone generating system according to claim 2 further comprising:

intermanual means for coupling said secondary signal to said main selection means to render said main signal responsive to the ones of said plurality of voice signal generators selected by said secondary selection means.

4. A tone generator system according to claim 3 wherein said intermanual means comprises a single switch.

5. A tone generator system according to claim 3 wherein said intermanual means further includes:

divider means for reducing the frequency of each of the frequency components in said secondary signal by a given divisor whereby suboctave intermanual coupling is provided.

6. A tone generator system according to claim 3 wherein said intermanual means further includes:

multiplier means for increasing the frequency of each of the frequency components in said secondary signal by a given multiplier whereby superoctave intermanual coupling is provided.

7. A tone generating system according to claim 1 wherein said main selection means further includes:

frequency changing means coupled to said main selection means and operative to combine and to change in frequency the frequency components of said main signal by a given factor, so that intermanual coupling is provided.

8. A tone generating system according to claim 1 further comprising:

a plurality of celeste signal generators each corresponding to a different one of said plurality of key signal generators, each one of said plurality of key signals repeating at a different respective frequency, each of said plurality of celeste signal generators producing a celeste signal at a frequency separated by less than an octave from the frequency produced by the corresponding one of said plurality of key signal generators; and a plurality of celeste sampling means, each operable to repetitively sample said main signal in response to a corresponding one of said plurality of celeste signal generators, said plurality of main and celeste sampling means being both coupled to said main output means.

9. A tone generating system according to claim 8 wherein the respective frequencies of corresponding ones of said plurality of key signal generators and said plurality of celeste signal generators are in a predetermined ratio to one another.

10. A tone generating system according to claim 1 wherein one of said plurality of voice signal generators includes an offset means for shifting the repetition rate thereof a predetermined amount from that of the other ones of said plurality of voice signal generators, said predetermined amount being sufficient to produce aurally perceptible phase wander but imperceptible shift in the pitch of said plurality of notes.

11. A tone generating system according to claim 1 wherein said plurality of voice signal generators comprise a first and second class of voice generators, said main selection means comprising:

a first-class switching means for combining selected ones of said first-class of voice generators to produce said main signal; and a second-class switching means for combining selected ones of said second-class of voice generators to produce a second-class signal, said plurality of main sampling means further including:

a plurality of second-class sampling means each operable to repetitively sample said second-class signal in response to a corresponding one of said plurality of key signal generators to produce a plurality of second-class sampled signals, said tone generating system further comprising:

second-class output means for combining audio frequency components contained in said second-class sampled signals, said main and second-class output means providing separate output signals, said main keyboard means operative to simultaneously actuate the ones of said plurality of main and said plurality of second-class sampling means being driven by the same one of said plurality of key signal generators.

12. A tone generating system according to claim 11 wherein each one of said plurality of main sampling means further comprises:

first modulator means responsive to said main keyboard means for initially limiting the magnitude of output produced by the associated one of said plurality of main sampling means;

each one of said plurality of second-class sampling means comprising:

second modulator means responsive to said main keyboard means for initially limiting the magnitude of output produced by the associated one of said plurality of second-class sampling means.

13. A tone signal generating system according to claim 12 further comprising:

first and second attack generators producing a first and second attack signal, respectively, each being periodic and each having a different waveshape, each of said first and second modulator means comprising:

an attack sampler responsive to said main keyboard means for sampling the associated one of said first and second attack signals at a given rate for a predetermined interval of time; and hold means for maintaining the output of said attack sampler at a high magnitude after said predetermined interval of time.

14. A tone generating system of an electronic organ for producing a plurality of notes each having a frequency corresponding to a different note on a musical scale comprising:

a plurality of voice signal generators each producing a supersonic signal having a different waveshape;

a manually operable main selection means for combining selected ones of said plurality of voice signal generators to produce a main signal;

a plurality of key signal generators producing a plurality of key signals, each of said plurality of notes corresponding to and having a predetermined relation with a different one of said plurality of key signals, the inter-frequency spacing between adjacent ones of said plurality of notes being less than one octave, said plurality of notes having frequencies spanning more than an octave;

a main sampling means for sampling said main signal and being operable to respond to and to combine into a single signal all of said plurality of key signals to produce said plurality of notes, said main sampling means being operable to produce notes that are spaced less than an octave, said main sampling means comprising a switch device having a signal input terminal coupled to said main signal, and manually playable main keyboard means for actuating said main sampling means and operable to cause said main sampling means to respond to any combination of said plurality of key signals, said switch device having a control input terminal coupled to said main keyboard means, said main keyboard means mixing selected ones of said key signals together and coupling said mixed signals to said control input terminal.

15. A tone generating system according to claim 14 further comprising:

manually operable secondary selection means for combining selected ones of said plurality of voice signal generators to produce a secondary signal;

a secondary sampling means for sampling said secondary signal and being operable to respond to each of said plurality of key signals to produce said plurality of notes; and manually playable secondary keyboard means for actuating said secondary sampling means and operable to cause said secondary sampling means to respond to any combination of said plurality of key signals.

16. A tone generating system according to claim 15 further comprising:

intermanual means for coupling said secondary signal to said main selection means to render said main signal responsive to the ones of said plurality of voice signal generators selected by said secondary selection means.

17. A tone generator system according to claim 16 wherein said intermanual means comprises a single switch.

18. A tone generator system according to claim 16 wherein said intermanual means further includes:

divider means for reducing the frequency of each of the frequency components in said secondary signal by a given divisor whereby suboctave intermanual coupling is provided.

19. A tone generator system according to claim 16 wherein said intermanual means futher includes:

multiplier means for increasing the frequency of each of the frequency components in said secondary signal by a given multiplier whereby superoctave intermanual coupling is provided.

20. A tone generating system according to claim 14 wherein said main selection means further includes:

frequency changing means coupled to said main selection means and operative to combine given ones of said plurality of voice signal generators and to change in frequency the frequency components of each by a given factor, so that intramanual coupling is provided.

21. A tone generating system according to claim 14 further comprising:

a plurality of celeste signal generators each corresponding to a different one of said plurality of key signal generators, each of said plurality of celeste signal generators producing a celeste signal at a frequency separated by less than an octave from the frequency produced by the corresponding one of said plurality of key signal generators, said main sampling means being responsive to said plurality of celeste signal generators.

22. A tone generating system according to claim 21 wherein the respective frequencies of corresponding ones of said plurality of key signal generators and said plurality of celeste signal generators are in a predetermined ratio to one another.

23. A tone generating system according to claim 14 wherein one of said plurality of voice signal generators includes an offset means for shifting the repetition rate thereof a predetermined amount from that of the other ones of said plurality of voice signal generators, said predetermined amount being sufficient to produce aurally perceptible phase wander but imperceptible shift in the pitch of said plurality of notes.

24. A tone generating system according to claim 14 wherein said main sampling means includes integrator means for integrating each sample of said main signal.

25. A tone generating system according to claim 24 wherein said plurality of key signal generators each have a duty cycle, and wherein said main sampling means produces notes having a magnitude proportional to the duty cycle of the corresponding one of said plurality of key signals, each of said plurality of key signals having a duty cycle sized to produce from said main sampling means notes of substantially the same magnitude.

* * * * *